Feb. 9, 1926.
J. DUVALL
1,572,110
SHEARING DEVICE FOR ENVELOPE MAKING MACHINES AND THE LIKE
Filed April 27, 1922 3 Sheets-Sheet 1
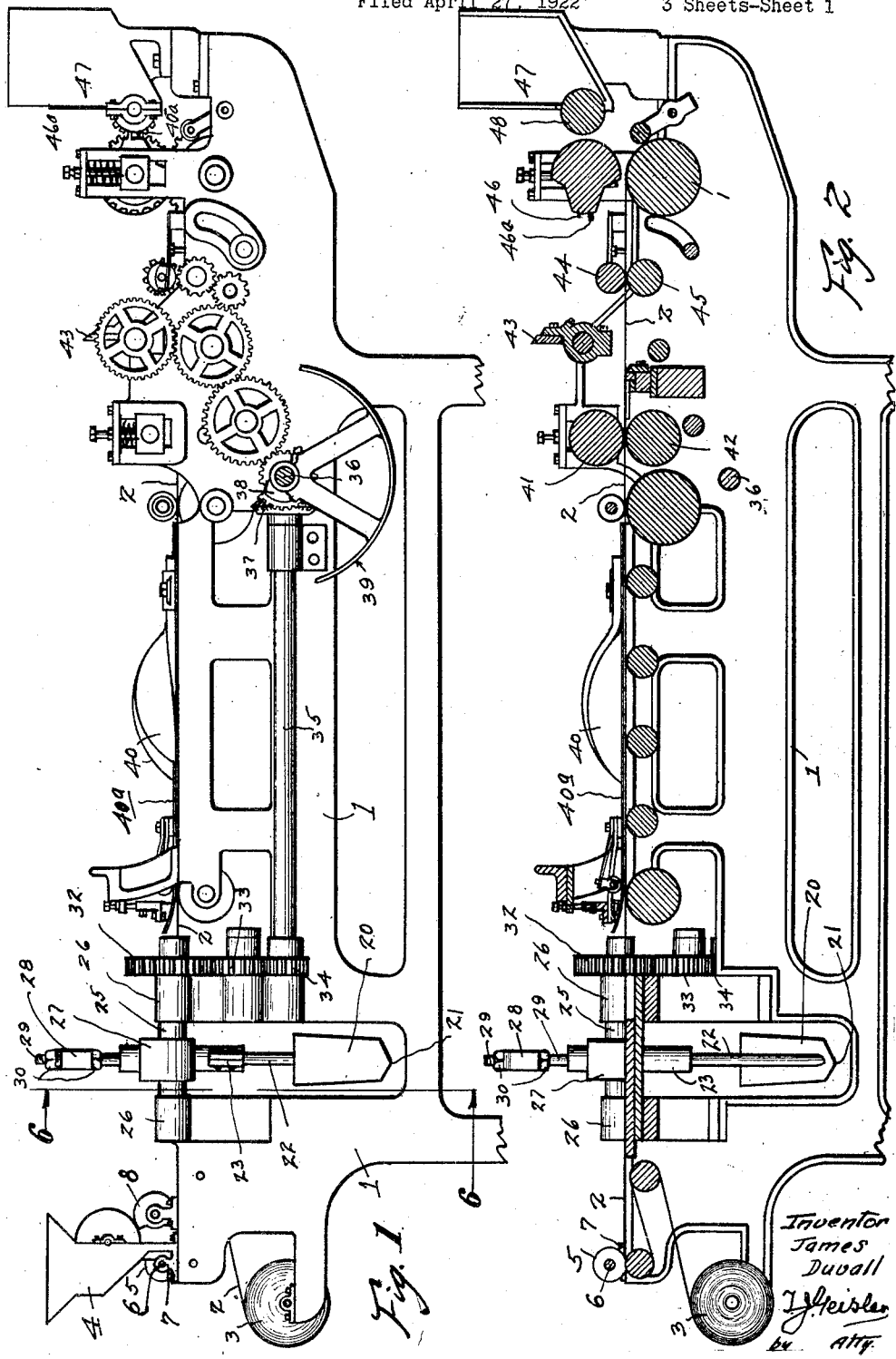
Inventor
James Duvall
by J. Geisler
Atty.

Feb. 9, 1926.
J. DUVALL
1,572,110
SHEARING DEVICE FOR ENVELOPE MAKING MACHINES AND THE LIKE
Filed April 27, 1922
3 Sheets-Sheet 2
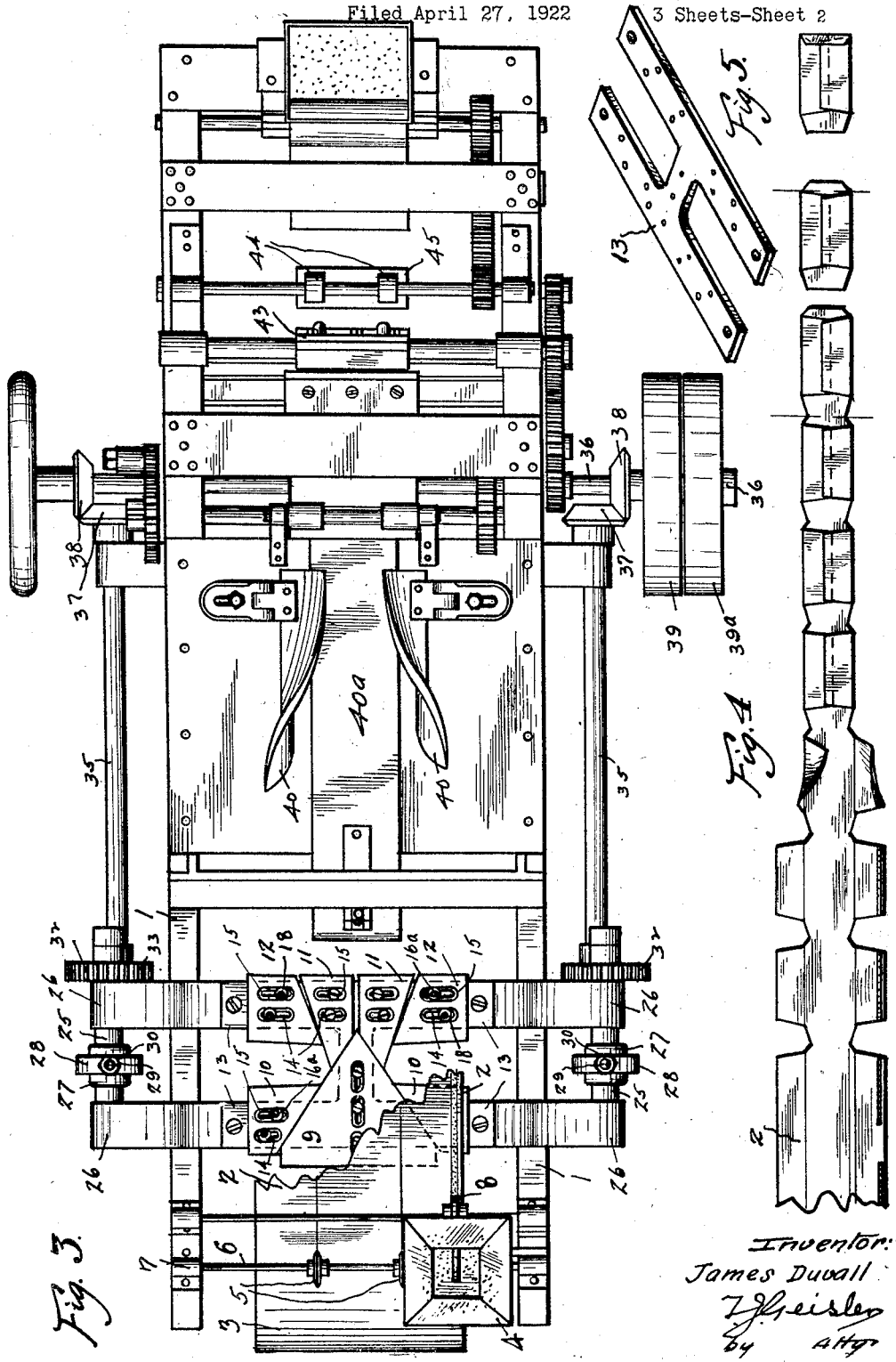
Inventor:
James Duvall

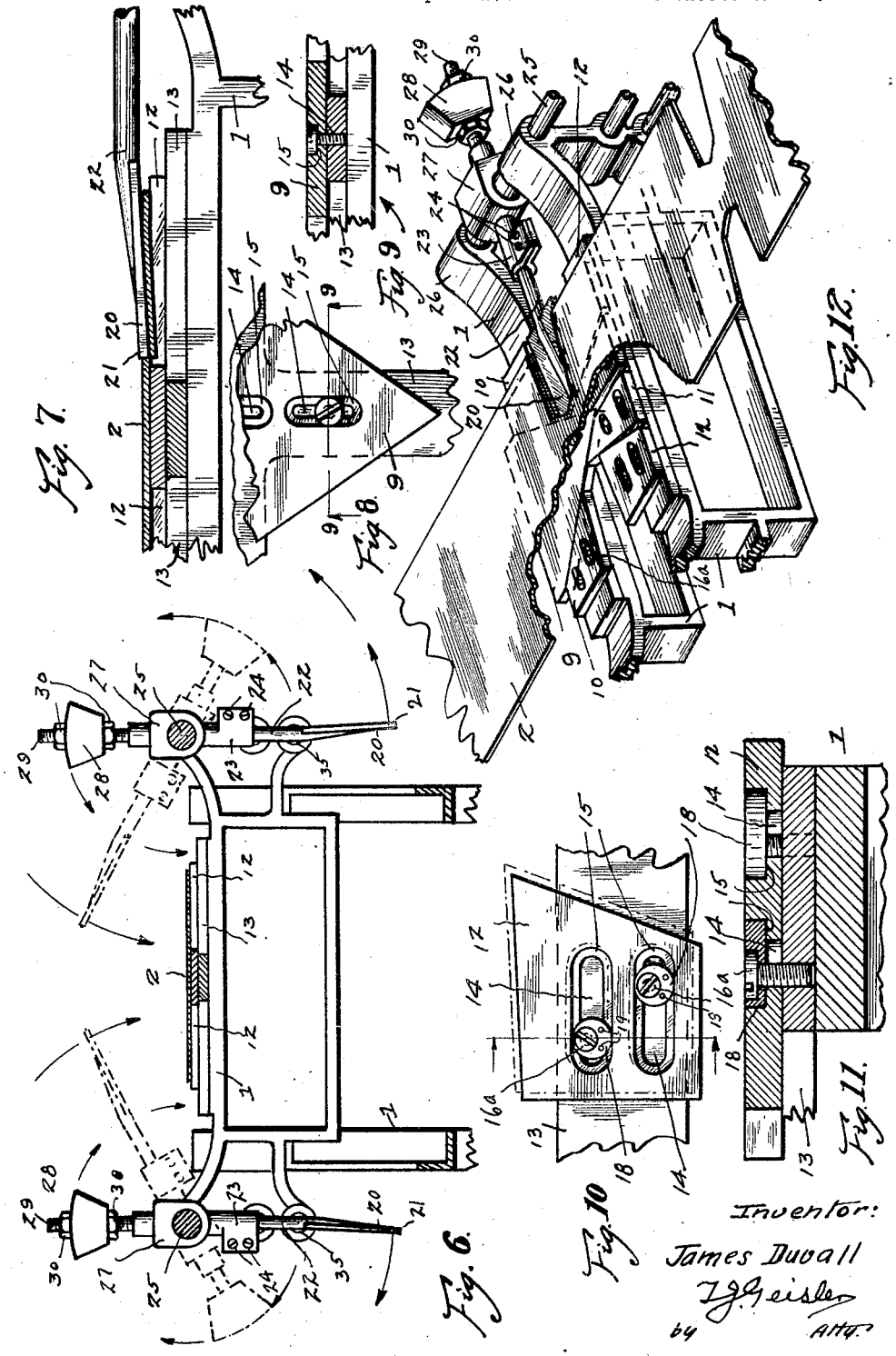

Patented Feb. 9, 1926.

1,572,110

UNITED STATES PATENT OFFICE.

JAMES DUVALL, OF CAMAS, WASHINGTON.

SHEARING DEVICE FOR ENVELOPE-MAKING MACHINES AND THE LIKE.

Application filed April 27, 1922. Serial No. 556,873.

*To all whom it may concern:*

Be it known that I, JAMES DUVALL, a citizen of the United States, and a resident of Camas, county of Clark, and State of Washington, have invented a certain new and useful Improvement in Shearing Devices for Envelope-Making Machines and the like, of which the following is a specification.

My invention relates particularly to the cutting devices of envelope making machines, by which portions are cut out of the sides of the long strip of material from which the envelopes are being made. It further relates particularly to shearing devices comprising a stationary die-element and co-operating revolving die element.

In order to facilitate the cutting operation, the cutting devices have heretofore been devised to operate with a shear instead of a punch; but the shear has been made along lines parallel with the sides of the strip. Such shearing tended to displace the strip, more or less, relatively to its alinement, and also tended to interfere with the travel of the strip.

The object of my invention is to provide shearing means adapted to increase the efficiency and speed of the machine by not interfering with the movement of the strip through the machine, or subjecting it to any action tending to displace it relatively to its path of motion, or interfering with its rate of travel. My invention further has for its object to restrain any undue vibration or bowing tendency of the shafts carrying the blades, so as to insure that the cutting edges of the latter will always properly co-operate with the cutting edges of the stationary dies.

I attain my object by providing at each side of the strip, shearing devices comprising a stationary die-plate and a blade revolving in a plane transverse to the path of motion of said strip, and providing the blades at their sides with cutting edges arranged to make an oblique angle with the co-operating transverse shearing edges of the die-plate during the passing of the blade through the strip.

Furthermore, I prefer to taper the extremities of the blades to a point. Thus the pointed extremities of the blades easily cut through the strip, and the cut is completed by the shear of the side edges of the blades and the die plates; and since the lines of the latter shear extend transversely of the strip, both blades exert an equal pull on the sides of the strip, thus keeping it properly and uniformly tensioned during the shearing operation, and the latter does not tend to displace the strip, or to interfere with its normal travel.

A further object is to provide the stationary die plates composed of sections which are easily and accurately adjustable, and readily removable.

The above described features and others incidental thereto I have fully described hereinafter and illustrated in the accompanying drawings, in which:

Fig. 1 is a side elevation of an envelope machine provided with my improved shearing devices;

Fig. 2 is a longitudinal section of Fig. 1;

Fig. 3 is a plan view of the machine shown in Figs. 1 and 2 showing a portion of the paper as it is about to pass the stationary cutting dies; this view also showing the cutter bars perpendicular with the cutting die downward;

Fig. 4 is a diagrammatic representation of the different stages of a sheet of paper when being formed into an open end envelope. The diagram is positioned so as to approximate the position of the part of the machine shown in Fig. 3 which causes the operation;

Fig. 5 shows the die block upon which the adjustable die plates are mounted;

Fig. 6 is a fragmentary sectional view taken on the line 6—6 of Fig. 1 and indicates the rotation of the cutter bars;

Fig. 7 is a fragmentary view illustrating how the points of the rotatable die strikes the paper first and the shearing action is from the point towards the edge of the moving sheet of paper;

Fig. 8 is a fragmentary view of the point of the central movable die;

Fig. 9 is a fragmentary sectional view taken on the line 9—9 of Fig. 8 and shows how the set screw is fastened into the die block and allows restricted lineal motion;

Fig. 10 is a detail view showing one of the adjustable and stationary dies and shows in dotted lines how the blocks may be adjusted slightly by means of the eccentric washers;

Fig. 11 is a sectional view taken on the line

11—11 of Fig. 10 and shows how the set screws holding the adjustable dies are fastened to the die block; and Fig. 12 is a partial fragmentary perspective view showing the stationary dies assembled and showing one of the cutter bars as just passing thru the web of moving paper.

The cutting and forming mechanism of my improved envelope machine is mounted on the bed of the frame 1.

The moving web or strip of paper 2 is unwound from the roll 3 at the forward end of my machine, and is drawn over suitable guide rolls and under the paste box 4 and the creasing mechanism 5. The creasing mechanism is mounted on a shaft 6 journaled transversely of the frame in the bearings 7. The paste wheel distributes the paste from the paste box 4 to the strip as is common in envelope machines of this character. The means for cutting away portions of the strip of paper 2, which is the portion of the machine with which my invention particularly concerns, are made up of a fixed die and a rotating die including a blade. The fixed die is made up of a number of sections 9, 10, 11, and 12 which are mounted on an H-shaped die plate 13. Section 9 is fastened to the H-shaped die plate 13 along the longitudinal center line of the frame 1 and is movable lineally thereon. The trapezoidal sections 10 which are mounted at each side of the section 9, are adjustable angularly and transversely of the frame. The angular sides of the member 10 which bear against the adjacent angular sides of the section 9, are complementary and thus when the member 9 is adjusted longitudinally of the frame, the sections 10 may be adjusted laterally and in any position of the latter adjacent sides will be in parallelism.

The die sections 11 and 12 on the opposite side of the H-shaped die plate are permitted transverse and angular movement but not longitudinal movement. The angular abutting faces of the members 11 and the triangular section 9 also are complementary and thus when the section 9 is adjusted longitudinally, the members 11 may be adjusted transversely and their adjacent faces will continue in abutment along their entire face. The sections 12 are also movable to permit the adjusting of the sections 11.

All of the sections are provided with elongated slots 14 in which a shoulder 15 is formed. The sections are fastened to an H-shaped die plate 13 by bolts 16 and 17. Bolts 17 pass through the slots 14 in the section 9 and bolts 16 pass through the slots in the sections 10, 11 and 12. On each of the bolts 16, I provide an eccentrically bored washer 18 which rests upon the shoulder 15 in these slots and bears against the sides of the slots. The rotation of said washers thus tends to move the sections relatively to the die plate 13. When there are two of these slots provided, with bolts and eccentrically bored washers, it is possible to adjust the sections angularly as well axially as is diagrammatically shown in Fig. 10. For convenience I provide two small holes 19 in each of these eccentrically bored washers 18 to receive a two pronged wrench, by the use of which this adjustment is made.

There are two revolving die members 20, one at each side of the machine and said dies move in synchronism and cut away similar portions from opposite sides of the moving strip. The cutting blades of said dies 20 are provided with shanks 22 which are removably secured in sockets 23, forming a part of the member. The sockets are provided with clamping bolts 24. These cutting blades are mounted on two longitudinally arranged stub shafts 25 which are each journaled in two bearings 26, formed at opposite ends of the transversely mounted parallel beams 26ᵃ. The hub 27 of each member 23 is substantially as wide as the spacing between the two journals 26, and thus there is little opportunity for the shaft 25 to be bowed so as to gyrate about its normal axis of rotation.

The members 23 to which the die members 20 are secured are provided at their opposite dies with counterweights 28 which are adjustable longitudinally on the rods 29 which are substantially alined with the shank 22 for the rotating blade. Said counterweight 28 is held in set position by two nuts 30 and 31, which are threaded on the shaft 29, at each side of the counterweight 28. The counterweight is adjustable to permit it to be set in such a manner as to exactly counter-balance the blade of the die member 20, and thus when any given blade is placed in the socket 23, the counterweight is adjusted longitudinally of the arm 29 until it exactly balances the blade. It is held in set position by tightening the nuts 30 and 31 at each side of the same.

The counterweight 28 is preferably elongated, and to cut down its air resistance is arranged so that it will rotate flatwise in its plane of rotation. As a result of the rotating die being absolutely counter-balanced, that is, with the center of mass of the rotating body lying exactly upon the axis of rotation, there is no tendency of said axis to gyrate.

The short spacing of the bearings 26 also minimizes the tendency of the shaft to be sprung and thus the rotating die registers exactly with the fixed die at all times and at all speeds. For this reason, the speed of the machine is not limited by the effect of centrifugal force, which tends to throw the dies out of registration as the speed increases.

As can be noted in Fig. 7, the extremity 21 of the rotating blades 20 lies slightly below the remaining portions of the rotating blade and thus said extremity strikes the paper first. The remaining portions of the machine are inclined away from this point and thus the remaining cutting edges of the blade strike the paper at an angle. The angle of each blade is the same and for the reason that the cut is made from the inner extremity of the incision, towards the edges, simultaneously, the shearing action of each rotating blade is counteracted by the shearing action of the other oppositely rotated blade.

It has been my observation that when a rotating die strikes the web of paper at an angle it tends to displace the paper relatively to the fixed die and thus holding means must be provided in order to prevent this. In my machine, however, the tendency of the shearing action of each blade to displace the paper relatively to the fixed die is counteracted by the tendency of the other blade to move the paper in the opposite direction. The shearing actions being the same, thus results in the two forces being equal and as they are opposite they exactly counter-act each other and do nothing but produce tension between the two incisions.

The web 2 is drawn past the rotating members at a continuous rate and therefore the time necessary for the blade to pass through the moving web as compared with the time necessary for the web to move from the position of one incision to the position of the succeeding incision, must be short or else it will interrupt the movement of the web. For this reason the blade 20 is made very thin, and the shaft 25 is extended beyond the frame 1 so as to permit the shank to be relatively long. The circumference of the circle described by the tip 21 of the blade 20 is, therefore relatively large compared with the thickness of the blade 20. The time necessary for the blade to pass through the paper is therefore relatively small as compared to the time required for the blade to make a complete revolution, in moving from one cut and into position for the succeeding cut. As a result of the devices hereinbefore described, the sheet may be moved uniformly and continuously without causing the inner or forward edge of the incision to be held up by the blade, for so long a period that it would result in a tear or an imperfect cut.

To produce an incision which is made purely by shearing action, as compared with an incision made partly by a shearing action and partly by a punching action, I have made the extremity 21 of the rotating die blade 20, pointed. The rotating blade 20 is arranged so that its sides, that is, the border portions, which are substantially parallel to its plane of rotation, are arranged to make an oblique angle with the co-operating shearing edges of the fixed die during the passage of the blade through the strip, and the extremity 21 of the blade is arranged to strike the sheet in advance of the remaining portion of the blade. In this way, the blade strikes the sheet at its point first and the cut is thus made towards the edge of the sheet at an oblique angle in opposite directions until it reaches the sides which are parallel to the plane of rotation of the rotating blade and the cut is then continued as a shearing cut along these parallel edges.

The diverging edges of the pointed blade 20 also serve to guide the co-operating cutting edges of the fixed and rotating dies so as to prevent them from striking each other during the cutting operation. The pointed extremity enters the fixed die before the remaining portions of the blade and will thus spring the blade slightly to one side or the other, if necessary, so that the cutting edges of the rotating die will slide by the co-operating edges of the fixed die.

The parts of the machine which complete the envelope are old in the art and thus will not be described in detail. The shafts 25, on which the rotating blades are mounted, are each provided with a gear 32, and said gears 32 mesh with idling gear 33, which in turn mesh with driving gears 34 on each of the main driving shafts 35. Said main driving shafts 35 extend longitudinally of the machine each side, as shown in Fig. 1, and are each provided with a bevel gear 37 which meshes with a similar bevel gear on the power shaft 36.

The power shaft extends transverse of the machine and drives both shafts 35 on the opposite sides of the frame 1. The driving pulley 39 and the idling pulley $39^a$ are mounted side by side on a power shaft 36 and are adapted to have a belt placed over the same. After the moving web of paper has been creased, and the incision made, it is passed under the folding plate $40^a$. The overlapping folding members 40 make the longitudinal fold and the sheet, in tubular form, passes under the rolls 41 and 42, which make the fold definite. The strip then passes under the rotating knife 43 which severs the web into separate envelopes and pincher rolls 44 and 45 feed these envelopes to the pasting and creasing mechanism 46, which forms and seals the bottom flap of the envelope. The pasting sector $46^a$ receives a supply of paste from the paste box 47 through the medium of the pasting roll 48 with which the pasting sector $46^a$ comes in contact once each revolution.

I claim:

1. In a machine of the character described, shearing devices comprising a stationary shearing element and moving shearing elements, the latter located oppositely, one on each side of the path of the strip to be severed, said moving shearing elements being arranged and operated to move against, and to intersect, the plane of the stationary shearing element simultaneously at an oblique angle.

2. In a machine of the character described, shearing devices comprising a stationary shearing element and moving shearing elements, the latter located oppositely, one on each side of the path of the strip to be severed, said moving shearing elements being arranged and operated to move against, and to intersect, the plane of the stationary shearing element simultaneously at an oblique angle, the shearing edges of said moving shearing elements extending transversely of said path.

3. In a machine of the character described, shearing devices comprising a stationary shearing element and revolving striker arms, the latter located oppositely, one on each side of the path of the strip to be severed, said striker arms being arranged and operated to move against, and to intersect, the plane of the stationary shearing element simultaneously at an oblique angle.

4. In a machine of the character described, shearing devices comprising a stationary shearing element and revolving striker arms, the latter located oppositely, one on each side of the path of the strip to be severed, said striker arms being arranged and operated to move against, and to intersect, the plane of the stationary shearing element simultaneously at an oblique angle, the shearing edges of said striker arms extending in the same general direction as the plane of rotation of said striker arms.

5. In combination with the stationary die-element of the shearing devices of a machine of the character described, a revolving die-element comprising a shaft arranged parallel with the path of the strip to be sheared, an arm carried by said shaft, and a blade carried by said arm, said blade provided with shearing edges at its sides extending in the same general direction as its plane of rotation, said revolving die-element being so relatively arranged to said stationary die-element that the side shearing edges of said blade of the former will make an oblique angle with the shearing edges of the latter while co-acting therewith, and means for restraining undue vibration of said shaft.

6. In the shearing devices of a machine of the character described, a rotated die-element comprising two oppositely extending arms, a removable blade carried by one of said arms, and an adjustable counterweight carried by the other of said arms.

7. In the shearing devices of a machine of the character described, a rotated die-element comprising two oppositely extending arms, a removable blade carried by one of said arms, an adjustable counterweight carried by the other of said arms, the bearing of said rotated die element being set close to the sides of the latter, and said counterweight having the greater part of its mass arranged flatwise with the plane of rotation thereof so as to pass between said bearings, means for adjusting said counterweight longitudinally of its arm, and means for holding said counterweight flatwise in said plane in any of its adjustments.

JAMES DUVALL.